(12) United States Patent
Yasuda (10) Patent No.: US 6,701,055 B2
(45) Date of Patent: Mar. 2, 2004

(54) APPARATUS AND METHOD FOR CUTTING PLASTIC OPTICAL FIBER

(75) Inventor: Nobuyuki Yasuda, Chiba (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 10/151,414

(22) Filed: May 20, 2002

(65) Prior Publication Data

US 2002/0181919 A1 Dec. 5, 2002

(30) Foreign Application Priority Data

May 28, 2001 (JP) ..................................... P2001-159363
Apr. 25, 2002 (JP) ..................................... P2002-123631

(51) Int. Cl.$^7$ ................................................ G02B 6/00
(52) U.S. Cl. ...................................... 385/134; 385/147
(58) Field of Search ................................. 385/114, 115, 385/134, 137, 147

(56) References Cited

U.S. PATENT DOCUMENTS

2003/0077062 A1 * 4/2003 Sasaki et al. ............... 385/134
2003/0113087 A1 * 6/2003 Lee et al. .................... 385/136

* cited by examiner

Primary Examiner—Phan T. H. Palmer
(74) Attorney, Agent, or Firm—Jay H. Maioli

(57) ABSTRACT

The present invention provides a method and an apparatus for cutting a plastic optical fiber having a cladding layer. The method includes a plurality of cutting steps for performing rough cutting under a rough cutting condition and finish cutting under a controlled cutting condition. With this method, since a load applied to an optical fiber upon cutting is reduced, degradation of transmission characteristics of the optical fiber after cutting can be reduced.

19 Claims, 9 Drawing Sheets

APPARATUS AND METHOD FOR CUTTING PLASTIC OPTICAL FIBER

BACKGROUND OF THE INVENTION

The present invention relates to an apparatus and a method for cutting a plastic optical fiber adapted for optical communication, which fiber has on its outer periphery a coating including a cladding layer.

Cutting of ends of plastic optical fibers for optical communication in order to mount the plastic optical fibers to optical signal connector plugs has been performed, for example, by pressing a sharp cutter to a plastic optical fiber, thereby shearing it with the pressing force (see Japanese Utility Model Registration No. 2573619). Such forcible cutting, however, causes an inconvenience that chips and/or cracks may occur in a cut plane of the plastic optical fiber, to degrade an accuracy of work in the subsequent step of forming an end face of the plastic optical fiber. To cope with such an inconvenience, an improved method has been disclosed, for example, in Japanese Patent Laid-open No. Hei 7-294748, wherein a plastic optical fiber is cut in a state that temperatures of both a cutter and the plastic optical fiber are raised by heating, thereby preventing occurrence of chips and/or cracks in a cut plane of the plastic optical fiber. Such a method, however, presents another problem that the raised temperature may give rise to deformation of a portion, other than an end face, of the plastic optical fiber, degradation of optical characteristics of the interior of the plastic optical fiber, and the like.

In most of plastic optical fibers (POFs), thermoplastic polymethyl methacrylate (PMMA) is used as a material of a core of the POF, and a fluorine based resin is used as a material of a cladding layer formed on an outer peripheral portion of the core. In addition, at present, a plurality of kinds of plastic optical fibers, each of which is of a multi-mode type, are being commercially available.

Figure 1A:
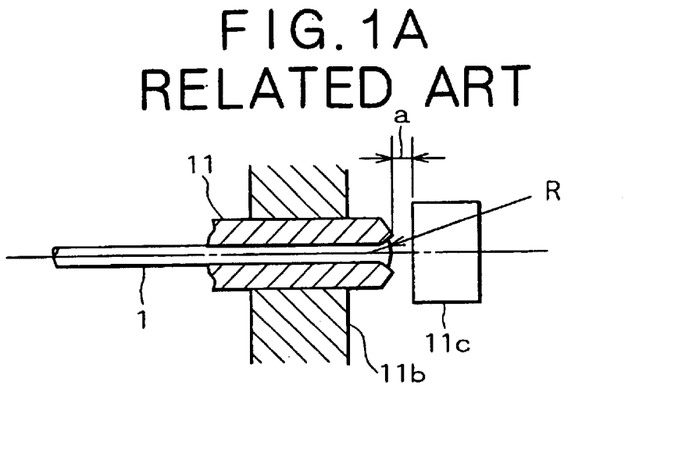
FIG. 1A is a view showing a state that a connector plug, to which a plastic optical fiber has been mounted, is inserted in a receptacle.

In the case of connecting a plastic optical cable led from one equipment to another equipment by mounting a POF of the cable to a connector plug and inserting the connector plug in a receptacle provided on another equipment, it is required that no change in optical transmission characteristics may occur even if the cable be replaced with a new cable. FIG. 1A is a typical sectional view showing a connector plug inserted in a receptacle. As shown in this figure, an end portion, inserted in a center hole of a connector plug 11, of a POF 1 is formed in a spherical plane R having a specific radius, and a distance "a" between the end portion of the POF 1 and a light receiving element 11c in equipment is set to a specific length.

The structure shown in FIG. 1A is designed such that a positional relationship between the receptacle 11b and the connector plug 11 can be kept constant even if the connector plug 11 is replaced with a new connector plug. As a result, the replacement of the connector plug 11 with a new connector plug does not exert any effect on transmission characteristics of the POF 1 insofar as a position of the spherical plane R of the end of the POF 1 to the connector plug 11 is kept constant.

Figure 1B:
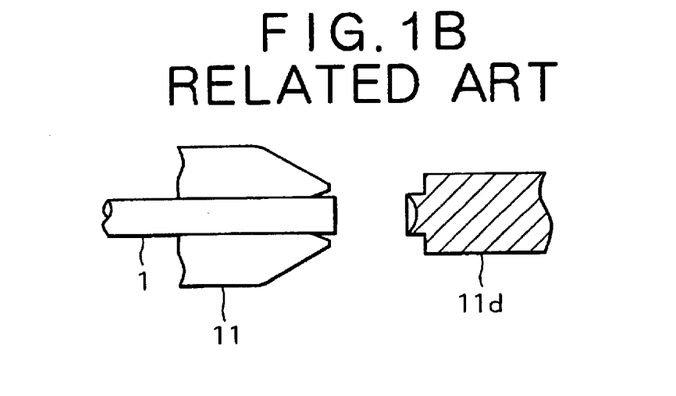
FIG. 1B is a view illustrating a step of forming an end face of a plastic optical fiber with a forming die.

The formation of an end face of the POF 1 as shown in FIG. 1B is performed by making use of thermoplasticity of the POF 1. More specifically, a forming die 11d having at its one end a concave plane of a specific radius is heated and is pressed to an end face of the POF 1 mounted to the connector plug 11. The end face of the POF 1 is softened by heat of the forming die 11d, with a result that the concave plane of the forming die 11d is transferred to the end face of the POF 1 as a convex plane R.

A volume of the softened resin is regarded not to be changed after the forming work. Accordingly, to keep constant the distance "a" shown in FIG. 1A, the POF 1 must be mounted to the connector plug 11 such that a position of the end face to the connector plug 11 before formation of the convex plane R of the POF 1 is kept constant. For this reason, there has been adopted a method of mounting the POF 1 to the connector plug 11 with a sufficient excess portion projecting from the connector plug 11, and cutting the POF 1 at a specific position associated with the connector plug 11, thereby keeping constant the position of the convex plane R formed in the subsequent step.

Figure 1C:
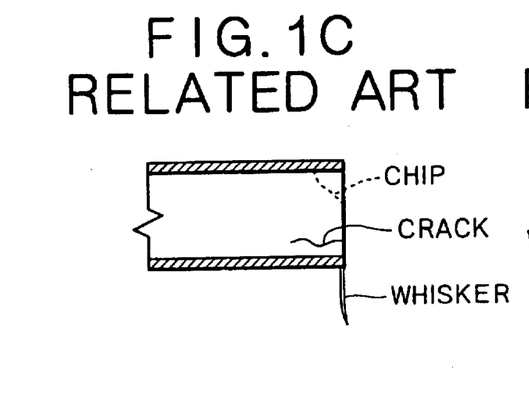
FIGS. 1C and 1D are views showing a state that chips and cracks exerting adverse effect on transmission characteristics occur in an end face of a plastic optical fiber when the end face of the plastic optical fiber is cut by a related art cutting method.

Cutting of POFs has been often performed by using sharp cutting tools such as a commercially available cutter or razor. In this case, however, as shown in FIG. 1C, chips of a resin forming the POF main body and/or cracks may occur in a cut plane perpendicular to the axial line of the POF. Such chips and/or cracks may remain in an end face to be formed in the subsequent step as shown in FIG. 1B, to cause failures that change transmission characteristics, such as deficiency of a convex plane or cracking.

Figure 1D:
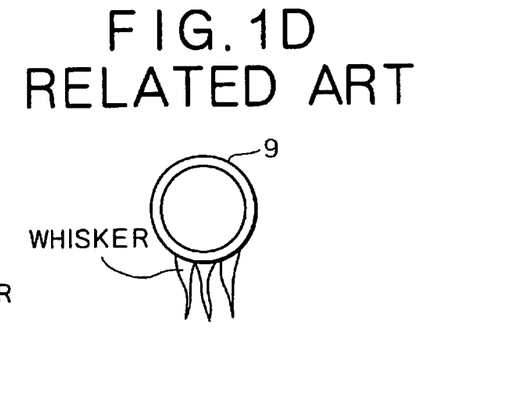

If a POF is cut with a previously heated cutter, as shown in FIG. 1D, a cladding layer and the like may extend longer in the form of whiskers, and such whiskers may adhere on a cut plane, to be rolled in a convex plane at the time of forming an end face of the POF, to degrade transmission characteristics of the POF.

By the way, a method of cutting a plastic material by using a cutter blade mounted to an ultrasonic vibration exciter has been known, for example, from Japanese Patent Laid-open No. Sho 58-175630, wherein the plastic material is cut by concentrating ultrasonic vibration at a portion to be cut of the plastic material via the cutter blade and imparting a force to the cutter blade being in contact with the plastic material.

To realize cutting of a POF with desirable optical transmission characteristics thereof kept, an attempt has been made to cut POFs by making use of such a high-frequency mechanical vibration cutting method or ultrasonic vibration cutting method. Even in the case of adopting this method, however, there may occur an inconvenience. Since a cladding layer and the like are provided on an outer peripheral surface of a core of a POF, when a cutter blade and the optical fiber are excessively heated (such heating occurs even by using a high-frequency mechanical vibration exciter), the cladding layer and the like may often extend longer in the form of whiskers and such whiskers may adhere on a cut plane, to be entrained in an end face of the POF at the time of forming the end face, thereby degrading transmission characteristics of the POF. Further, according to the related art high-frequency mechanical vibration cutting method, it is difficult to optimize working conditions required for obtaining a uniform finish cut plane, for example, a condition of determining the length of a cutoff piece of a POF.

SUMMARY OF THE INVENTION

An object of the present invention is to provide a method and an apparatus for cutting a plastic optical fiber, which are capable of reducing a load applied the plastic optical fiber upon cutting, thereby reducing degradation of transmission characteristics of the plastic optical fiber after cutting.

To achieve the above object, according to a first aspect of the present invention, there is provided a cutting apparatus for cutting a plastic optical fiber, including cutting means for cutting a plastic optical fiber, and positioning means for positioning the cutting means to at least a first position at which the plastic optical fiber is to be subjected to rough cutting, and to at least a second position at which the plastic optical fiber is to be subjected to finish cutting.

The cutting apparatus preferably includes vibration means for giving high-frequency mechanical vibration to a portion, being in contact with the plastic optical fiber, of the cutting means, and allowing the cutting means to heat and cut the contact portion of the plastic optical fiber.

To achieve the above object, according to a second aspect of the present invention, there is provided a cutting method of cutting a plastic optical fiber by using cutting means, including the steps of positioning the cutting means to a first position at which the plastic optical fiber is to be subjected to rough cutting, cutting the plastic optical fiber at the first position by the cutting means, positioning the plastic optical fiber to a second position at which the plastic optical fiber is to be subjected to finish cutting, and cutting the plastic optical fiber at the second position by the cutting means.

In the cutting method, preferably, in each of the cutting steps, the cutting means is heated by high-frequency mechanical vibration, to cut the plastic optical fiber.

The apparatus and method for cutting a plastic optical fiber according to the present invention, which are configured as described above, has the following effects:

Since a portion to be cut of a plastic optical fiber is finely cut while being heated by a sharp cutter blade representative of the cutting means, it is possible to significantly reduce a force applied to the plastic optical fiber upon cutting, and hence to prevent occurrence of chips and/or cracks in a cut plane of the plastic optical fiber and to prolong a service life of the cutter blade and reduce a cost required for replacement and adjustment of the cutter blade. Since the plastic optical fiber is thinly cut in the finish cutting step, it is possible to form an accurate, smooth cut plane of the plastic optical fiber, and hence to improve, in the subsequent step, an accuracy of forming an end face of the plastic optical fiber while preventing occurrence of a failure in this forming step.

In addition to the above-described basic configurations of the present invention, according to a preferable form of the present invention, an optimum temperature control may be performed in the finish cutting step. With this configuration, it is possible to prevent occurrence of an inconvenience caused by extension of a cladding layer and the like of the softened plastic optical fiber, without the need of any additional post treatment.

According to another preferable form of the present invention, the cutting apparatus having a large flexibility in working condition may be provided. More specifically, the working condition of the cutting apparatus can be changed variously in a wide range, for example, from a working condition adapted for cutting of plastic optical fibers in a very small quantity of a lot at a service shop to a working condition adapted for cutting of plastic optical fibers in a very large quantity of a lot at a factory, by changing a combination of basic cutting operations such as movement of a cutter blade representative of the cutting means in the cutting direction, movement of a plastic optical fiber in the direction perpendicular to the movement direction of the cutter blade, and control of a heating condition of the cutter blade due to high-frequency mechanical vibration.

According to a further preferable form of the present invention, the cutting means may be configured as a two-piece cutter blade element having a rough cutter blade and a finish cutter blade, with the two-piece cutter blade element mounted to one cutter haft. With this configuration, it is possible to simplify the cutting apparatus and the cutting works, and hence to reduce the cost required for cutting a plastic optical fiber.

According to still a further preferable form of the present invention, a plastic optical fiber may be mounted to a connector plug with a relatively longer excess portion projecting from the connector plug and the excess portion of the plastic optical fiber be repeatedly cut by several times. With this configuration, since the excess portion is repeatedly cut, it is possible to obtain a desirable cut plane of the plastic optical fiber, and since initial cutting of the excess portion of the plastic optical fiber may be roughly performed, it is possible to reduce the working cost, although the cutting is repeated by several times.

According to an additional preferable form of the present invention, a peripheral device such as a cooling device may be combined with the cutting device. With this configuration, the cutting device can be easily modified into that having a function satisfying a user's specification. Further, since the cutting device can be modified into that having a function satisfying the minimum user's specification, it can be matched with each user's specification at a low cost.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

Hereinafter, preferred embodiments of the present invention will be described with reference to the accompanying drawings.

Figure 2:
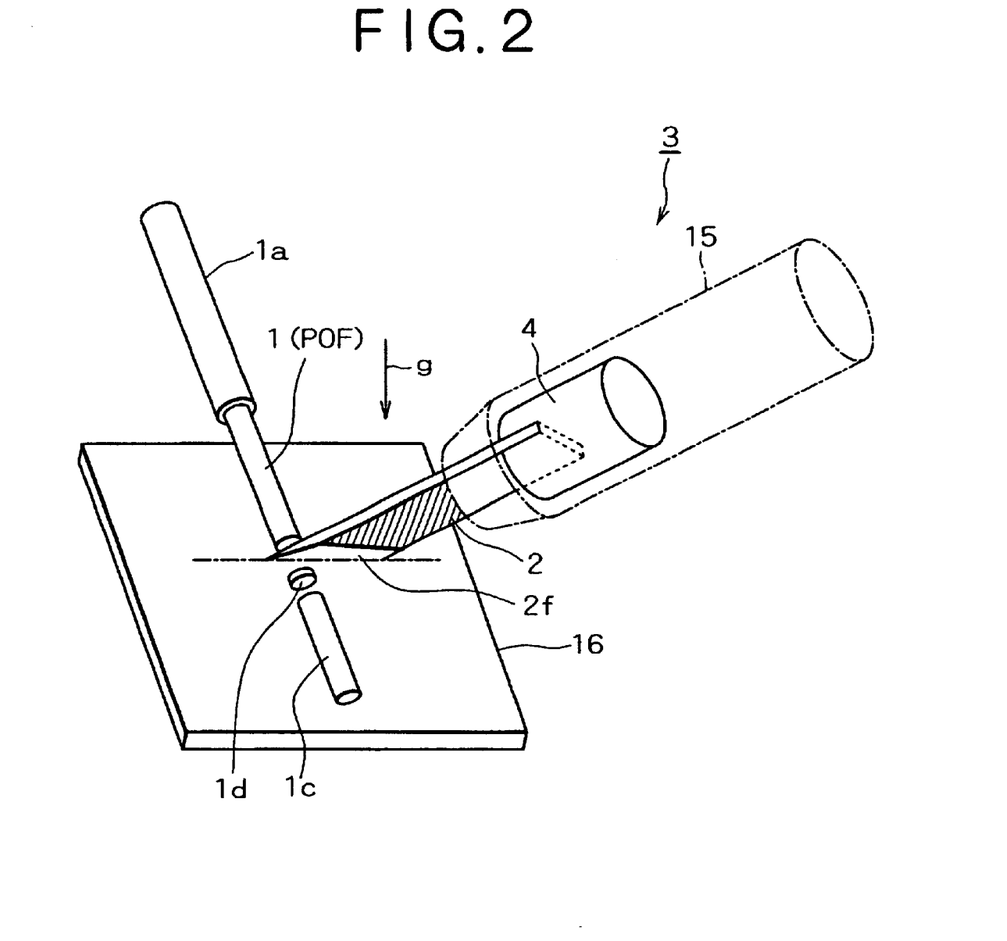
FIG. 2 is a view showing a state that a plastic optical fiber is cut by a cutter to which high-frequency vibration is being given.

A brief outline of a method of cutting a plastic optical fiber (POF) by making use of ultrasonic vibration will be first described with reference to FIG. 2. FIG. 2 is a typical perspective view showing a POF cutting method by using an ultrasonic cutter. A POF 1, which has been exposed from an optical fiber cable 1a by stripping a covering therefrom, is placed on a working table 16 representative of a base. The POF 1 includes a core at a central portion thereof, and a cladding layer at an outer periphery of the core. A protective layer for mechanically protecting the POF 1, and the like, may be provided on the outer peripheral surface of the cladding layer. In this specification, a cladding layer, a protecting layer, and the like, which are provided on the outer peripheral portion of a core, are generally called a "coating".

An ultrasonic cutter 3 representative of cutting means is configured such that a sharp cutter blade 2 is fixed to a high-frequency mechanical vibration exciter 4, and the cutter blade 2 is mounted, together with the vibration exciter 4, in a leading end portion of a cutter haft 15. The cutter haft 15 is depicted in perspective in FIG. 2. The ultrasonic cutter 3 is supported such that a side surface, hatched in FIG. 2, of the cutter blade 2 is perpendicular to a working plane of the working table 16 and a cutting edge line 2f is parallel to the working table 16. With the cutting edge line 2f positioned perpendicularly to the POF 1, the ultrasonic cutter 3 is vibrated in a direction "g" perpendicular to the working table 16, to thereby cut the POF 1. It may be preferred that the direction "g" be also perpendicular to the cutting edge line 2f.

When a high-frequency current is applied from a power source (not shown) to the high-frequency mechanical vibration exciter 4, ultrasonic vibration is induced to the leading end portion of the cutter blade 2. In this case, the cutter blade 2 acts as a horn. The cutting edge line 2f of the cutter blade 2 is then brought into contact with the POF 1 on the working table 16, whereupon the POF 1 is ultrasonically vibrated and thereby heated and softened. As a result, the POF 1 is easily cut in a direction perpendicular to the direction "g".

The state of a cut plane of the POF 1 differs depending on the length or thickness of a cutoff piece that has been cut off from the POF 1. It is commonly known that as the length of a cutoff piece of the POF 1 becomes shorter, the state of a cut plane of the POF 1 becomes better. The reason for this is that as the length of a cutoff piece of the POF 1 becomes longer, a load applied to a plane to be cut upon cutting becomes larger, to make the state of the cut plane worse, thereby increasing fractional defective of the cut plane.

In a general related art method of cutting an optical fiber cable, however, the POF 1 exposed from a covering of the optical fiber cable is made longer for easy working, and the POF 1 is cut so as to obtain a desired length of the POF 1. Such a general related art method fails to obtain a desirable cut plane of the POF 1 for the above-described reason. To cope with such an inconvenience, the present inventor has contrived a stepwise cutting method including a rough cutting step of cutting the POF 1 such that a rough cutoff piece 1c is cut off with a finish cutoff piece 1d having a specific thickness remaining yet, and a finish cutting step of cutting the POF 1 again such that the finish cutoff piece 1d is cut off, thereby suppressing the occurrence of a failure of the cut plane of the POF 1. The present inventor has experimentally confirmed that in accordance with the above stepwise cutting method including a rough cutting step and at least one finish cutting step, the POF 1 can be cut with the improved accuracy of a cut plane.

It is to be noted that the finish cutting is not limited to once but may be repeated by several times. In the case of repeating the finish cutting, thicknesses of several finish cutoff pieces 1d may be equal to each other, or sequentially reduced each time the cutting step is repeated.

In the rough finish cutting step, since the length or thickness of a cutoff piece of the POF 1 is large, ultrasonic vibration may be as large as possible to greatly raise the temperature of the POF 1 for softening the POF 1, and the POF 1 thus softened may be cut by a center orbits neighborhood of the blade plane of the cutter blade 2 to which a slight force may be given. The rough cutting under such a condition results in completion of cutting for a short time. On the other hand, in the finish cutting step, since the thickness of a cutoff piece of the POF 1 is small, ultrasonic vibration is controlled so as to be reduced for making the temperature rise of the POF 1 as small as possible, and the POF 1 is cut by the cutting edge of the cutter blade 2 to which a force is little given. The combination of strong induction and weak induction of ultrasonic vibration may be more finely changed.

The POF 1 can be desirably cut by selectively combining the basic steps of the above-described stepwise cutting method with each other. The stepwise cutting method may be further combined with some secondary steps such as a cooling step. This makes it possible to obtain a desirable cut plane of the POF 1 that exerts no adverse effect on transmission characteristics of the POF 1. It is to be noted that, in the embodiments, the POF cutting method and the apparatus therefor are described as those applied to a POF mounted in a connector plug; however, they are not limited thereto but may be extensively usable as a general POF cutting method and an apparatus therefor applied to a POF, for example, not mounted in a connector plug.

Figure 3:
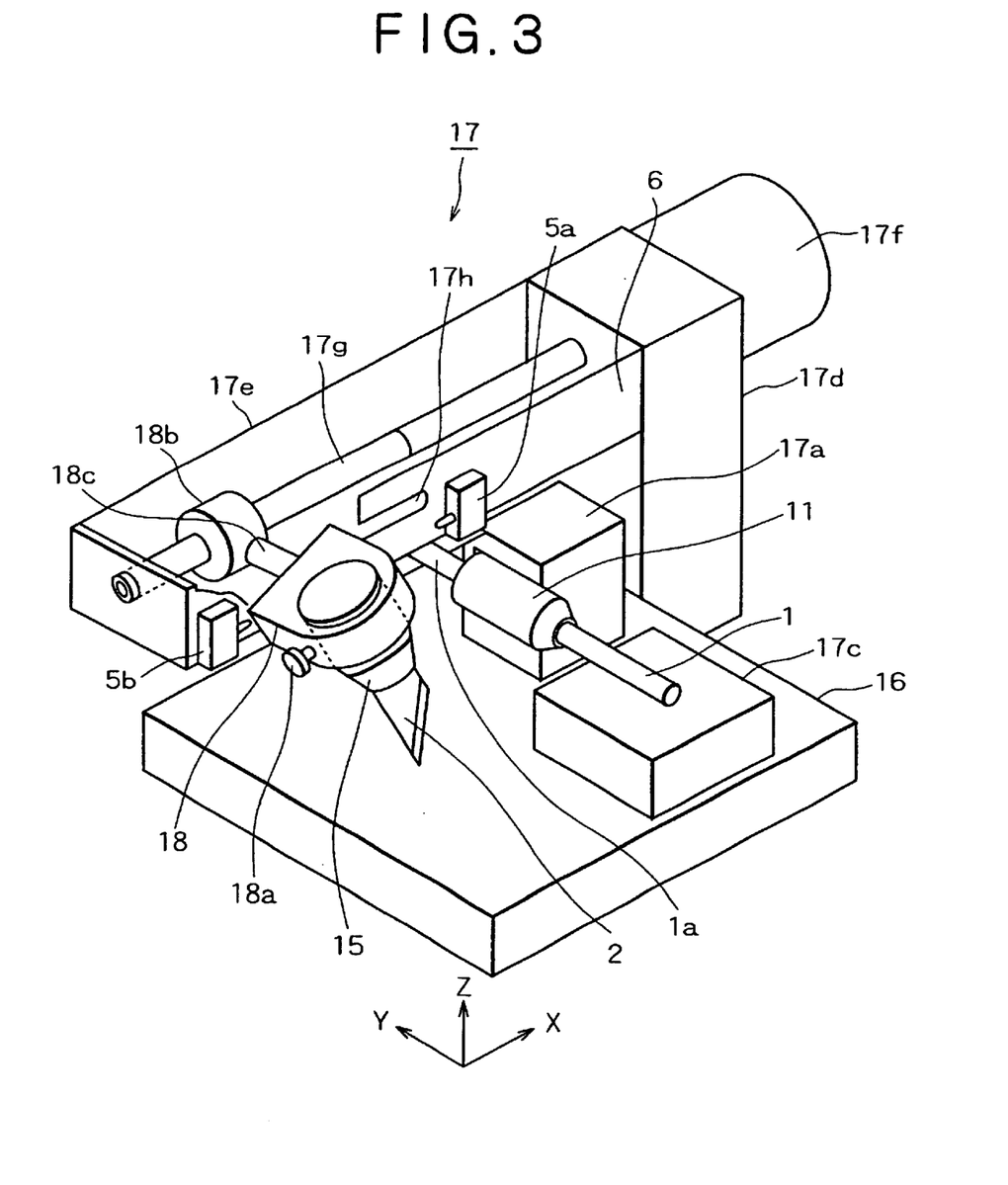
FIG. 3 is a perspective view showing a configuration of a plastic optical fiber cutting apparatus of the present invention.
Figure 4A:
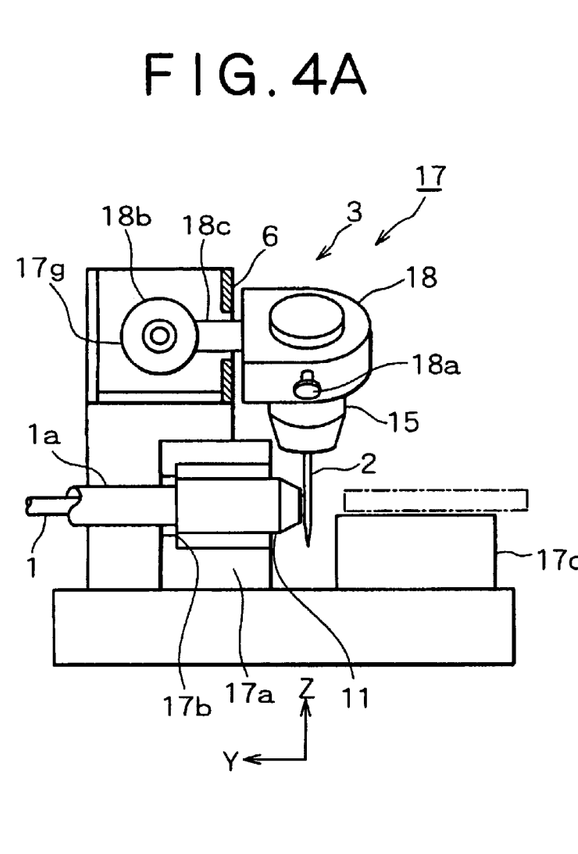
FIGS. 4A and 4B are projection views of a front surface and a side surface of the cutting apparatus shown in FIG. 3, respectively.
Figure 4B:
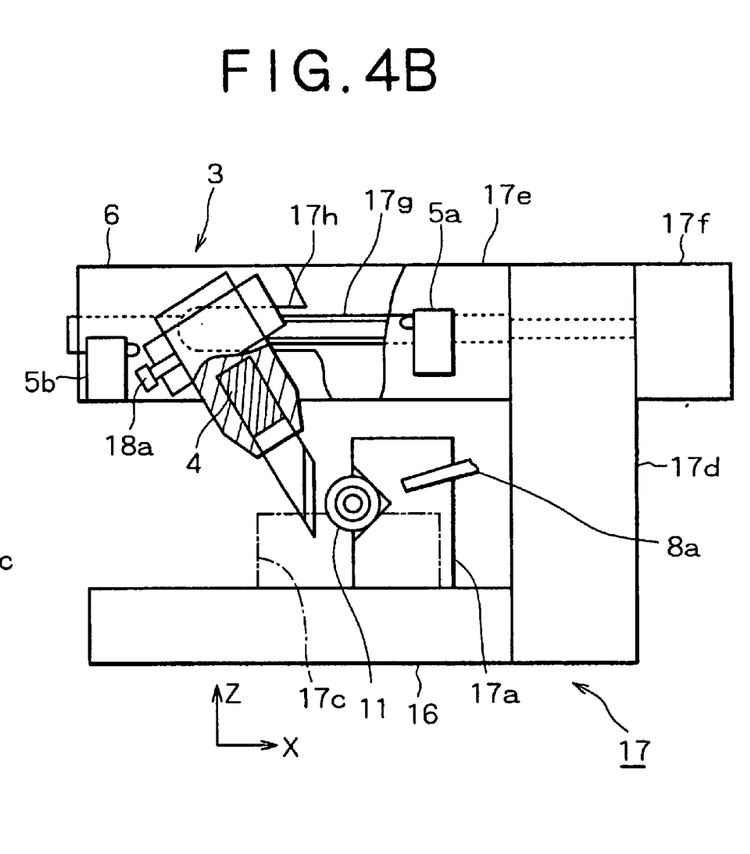

A plastic optical fiber cutting apparatus capable of semi-automatically cutting a POF 1 mounted to a connector plug 11 according to one embodiment of the present invention will be described with reference to FIGS. 3, 4A, and 4B. FIG. 3 is a perspective view of a plastic optical fiber cutting apparatus 17, and FIG. 4A is a projection view of a side surface of the cutting apparatus 17 and FIG. 4B is a projection view of a front surface of the cutting apparatus 17. In these figures, characters X, Y, and Z denote coordinate axes for the convenience of reference.

The POF 1, which has been exposed from an optical fiber cable 1a by stripping a covering therefrom, is mounted in the connector plug 11 in such a manner that a portion, having a sufficient excess length, of the POF 1 projects from the leading end of the connector plug 11.

The plastic optical fiber cutting apparatus 17 is configured such that respective members are built on an approximately rectangular base 16. It is to be noted that the front surface of the base 16 is kept as being parallel to an X-Y plane. A rectangular parallelopiped connector plug mounting base 17a is fixed to the base 16 at a specific position. A V-shaped groove extending in parallel to the Y-axis is formed in a mounting plane of the connector plug mounting base 17a, and a longitudinal positioning portion 17b for positioning the connector plug 11 in the Y-direction is formed at one end of the V-shaped groove in the (+Y)-direction.

A rectangular parallelopiped POF receiving base 17c is fixed to the base 16 at a position offset in the (−Y)-direction from that of the connector plug mounting base 17a.

Figure 5A:
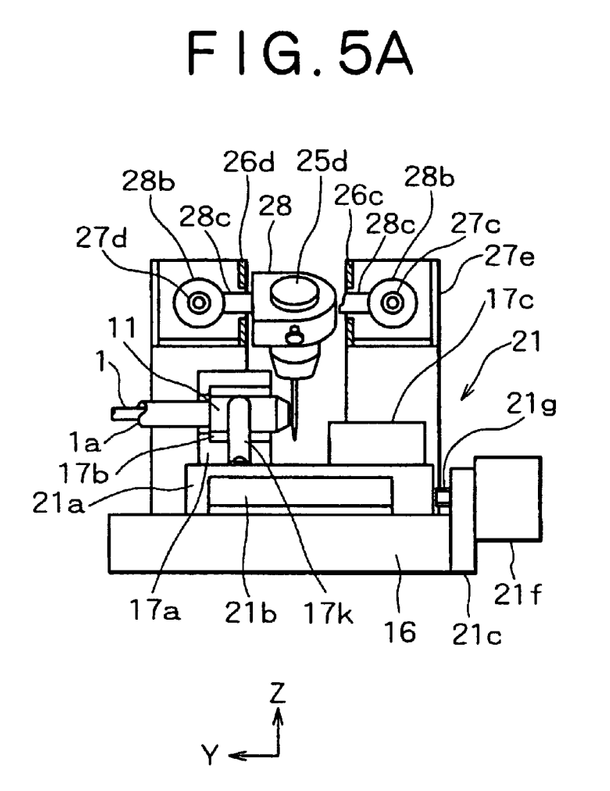
FIGS. 5A and 5B are projection views of a front surface and a side surface of a plastic optical fiber cutting apparatus of the present invention, which is provided with a rough cutter blade and a finish cutter blade.
Figure 5B:
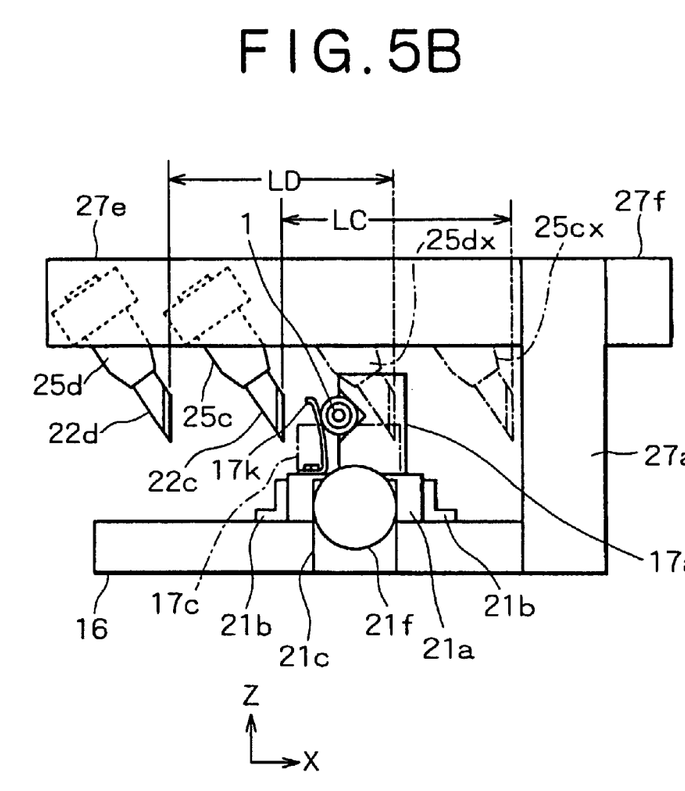

The connector plug 11 is mounted to the connector plug mounting base 17a by fitting a main body of the connector plug 11 in the V-shaped groove of the connector plug mounting base 17a, and bringing an end face, on the cable side, of the connector plug 11 into contact with the longitudinal positioning portion 17b, thereby positioning the connector plug 11 in the Y-direction. An excess portion projecting from the connector plug 11, of the POF 1 is placed on the upper surface of the POF receiving base 17c. It is to be noted that as shown in FIG. 5B (to be described later), the connector plug 11 may be held by pressing the connector plug 11 in the (+X)-direction by a plate spring 17k.

The upper surface of the POF receiving base 17c is depicted as a flat plane parallel to the X-axis and the Y-axis in FIGS. 4A and 4B; however, since a cutter blade 2 for cutting the POF 1 exerts a force to the POF 1 in the X-direction upon cutting, a projection extending almost in parallel to the Y-axis may be provided on the upper surface, of the-POF receiving base 17c for supporting the POF 1 from the (+X)-direction by the projection.

The portion, projecting from the leading end of the connector plug 11, of the POF 1 is cut, by the cutter blade 2, at a position where the cutter blade 2 comes into contact with the POF 1, which position is separated from the leading end of the connector plug 11 by a first specific distance. As shown in FIG. 4B, the cutter blade 2 is kept as being parallel to the X-Z plane with a cutting edge line 2f thereof kept as being parallel to the Z-axis perpendicular to the upper surface of the base 16. With this posture kept, the cutter blade 2 is fed in the (+X)-direction, to cut the POF 1.

A high-frequency mechanical vibration exciter 4 is connected to the cutter blade 2, to induce ultrasonic vibration in an object being in contact with the cutting edge line 2f of the cutter blade 2. The object is heated by ultrasonic vibration, to be easily cut. Both the cutter blade 2 and the high-frequency mechanical vibration exciter 4 are mounted in a leading end portion of a cutter haft 15. The cutter haft 15 is fixed to an ultrasonic cutter adapter 18, for example, in such a manner as to be fastened to the adapter 18 with a fastening screw 18a.

A column 17d is mounted to the base 16 in such a manner as to be movable in the Y-direction. A feed screw frame 17e is supported on the upper surface of the column 17d. A feed screw frame side plate 6 as a primary member of the feed screw frame 17e generally extends in parallel to the X-axis. The cutting position of the POF 1 is determined by a position of the cutter blade 2 in the Y-direction that is a longitudinal direction of the connector plug 11. The cutting position of the POF 1 can be thus determined by moving the column 17d in the Y-direction, thereby moving the cutter blade 2 in the Y-direction. In other words, the column 17d can be used as positioning means for positioning the cutting position of the POF 1.

A feed motor 17f is fixed to the right end of the feed screw frame 17e, and a lead screw 17g directly connected to a rotational shaft of the feed motor 17f is housed in the feed screw frame 17e. Along with rotation of the feed motor 17f, a nut 18b screwed with the lead screw 17g is moved in the X-direction. A slot 17h opened in the horizontal direction is provided in the feed screw frame side plate 6, and a connector 18c for connecting the nut 18b to the ultrasonic cutter adapter 18 is fitted in the slot 17h. Accordingly, the ultrasonic cutter adapter 18 is moved in parallel to the X-axis with the surface of the feed screw frame side surface 6 taken as a guide surface.

The contact position of the POF 1 with the cutting edge line 2f of the cutter blade 2 in the Z-direction can be adjusted by loosening the fastening screw 18a and moving the cutter haft 15 in the upward or downward direction. Alternatively, such adjustment may be achieved by modifying the column 17d such that it is telescopically moved with respect to the base 16 in the Z-direction.

After cutting, the position of the cutter blade 2 in the Y-direction is adjusted to apposition near the leading end of the connector plug 11, at which the POF 1 is to be cut with a portion, having a second specific length, of the POF 1 remaining. Thereafter, the movement of the cutter blade 2 in the X-direction may be repeated by controlling the rotational direction and rotating speed of the feed motor 17f. The cutting work is thus continuously performed.

The cutting apparatus 17 is controlled by control means for controlling the steps such as movement of the cutter blade 2 representative of the cutting means. The control means is generally represented by a control unit (not shown) called a sequencer. For automatically controlling the cutting apparatus 17, it is required to provide position detecting means for detecting the position of the ultrasonic cutter adapter 18 in the X-direction. Examples of the position detecting means may include a cutting start position detecting switch 5b representative of first position detecting means for detecting a cutting start position of the cutter blade 2 in the X-axis, and a cutting end position detecting switch 5a representative of second position detecting means for detecting a cutting end position of the cutter blade 2 in the X-axis.

These cutting end position detecting switch 5a and the cutting start position detecting switch 5b are generally referred to as a sensor switch 5. Each component of the sensor switch 5 is mounted on the feed screw frame 17e for detecting the movement position of the ultrasonic cutter adapter 18 in the X-direction. On the basis of detection signals from the sensor switch 5, for example, a current to be applied to the high-frequency mechanical vibration exciter 4 can be controlled via the sequencer.

In general, the cutting start position detecting switch 5b representative of the first position detecting means is actuated when the cutter blade 2 reaches an end, on the cutting start side of the cutter blade 2, of the POF 1, and the cutting end position detecting switch 5a representative of the second position detecting means is actuated when the cutter blade 2 reaches an end, on the cutting end side of the cutter blade 2, of the POF 1. As a result, when the cutting start position detecting switch 5b is actuated, an alternating current is applied to the high-frequency mechanical vibration exciter 4 via the sequencer, to raise the temperature of the cutter blade 2 by heating due to ultrasonic vibration. Meanwhile, when the cutting end position detecting switch 5a is operated, the alternating current applied to the high-frequency mechanical vibration exciter 4 is controlled so as to set the temperature of the cutter blade 2 to a specific temperature or less.

As shown in FIG. 4B, the sensor switch is exemplified by a simple, inexpensive limit switch of a contact type. From the viewpoint of long service life, the sensor switch may be configured as a photo-interrupter of a non-contact type. The number of sensor switches may be increased for finely controlling the start and end points of the cutting operation. To adjust a sensing position of a sensor switch, the mounting position of the sensor switch on the feed screw frame 7e may be changed or, while not shown, the position of a dog mounted on the ultrasonic cutter adapter 18 for actuating the sensor switch 5 may be changed.

The cutting work using such a plastic optical fiber cutting apparatus 17 will be described below. It is assumed that the step of determining the cutting condition necessary for cutting an optical fiber has been ended and the cutter blade 2 has been set at an optimum position. An optical fiber cable with the connector plug 11 as a workpiece to be cut is prepared. The connector plug 11 is set to the connector plug mounting base 17a by fitting the main body of the connector plug 11 in the V-shaped groove formed in the connector plug mounting base 17a, and bringing an end face, on the cable side, of the connector plug 11 into contact with the longitudinal positioning portion 17b, thereby positioning the connector plug 11 in the Y-direction. The connector plug 11 is then held by an appropriate manner. An excess portion, projecting from the leading end of the connector plug 11, of the POF 1 is placed on the upper surface of the POF receiving base 17c.

At this time, as shown in FIG. 4B, the cutter blade 2 is being located in front of the POF 1. By depressing a starting switch (not shown), the cutting operation is started. The cutter blade 2 is kept as being parallel to the X-Z plane with the cutting edge line 2f thereof kept as being parallel to the Z-axis perpendicular to the upper surface of the base 16. With this posture kept, the cutter blade 2 is fed in the X-direction. Ultrasonic vibration is induced in the POF 1 by the high-frequency mechanical vibration exciter 4 via the cutter blade 2, to raise the temperature of the POF 1 by heating due to ultrasonic vibration. The POF 1 is thus easily cut by the cutter blade 2.

The motion of the cutter blade 2 is controlled, by the sensor switch 5 and the like, to be returned to the start position and stopped thereat. After the end of cutting, the optical fiber cable with the connector plug 1 as the workpiece is removed from the cutting apparatus, and a next workpiece is set to the cutting apparatus. The first rough cutting step is thus ended.

In the case of subjecting each of a plurality of POFs to several cutting works, after the plurality of POFs are subjected to batch processing of a first single cutting step, for example, a rough cutting step as described above, the cutting condition, for example, the cutting position of the cutter blade 2 is changed by moving the position of the column 17d representative of the positioning means in the Y-direction, and the plurality of POFs are subjected to batch processing of a second single cutting step, for example, a finish cutting step. Such a cutting method is effective to subject a large number of POFs to several cutting works.

In the case of subjecting a POF to one step including several cutting works such as a rough cutting work and a finish cutting work, and further, a work other than any cutting work, for example, a work of blowing a flow of a coolant, it is required to take some measures therefor. From the viewpoint of hardware, as will be fully described later, it is required to provide a nozzle 8a for blowing a mist of a coolant, a sensor for detecting softening of a cladding layer, and the like. In some cases, it is required to provide a mechanism capable of automatically moving the cutter blade 2 in a direction other than the X-direction. On the other hand, from viewpoint of software, although cutting works are being almost manually performed at service terminals and being full-automatically performed at workshops in terms of mass-production, it is required to provide software for automation to meet various demands in a wide range from semi-automation to full-automation. In this way, the specification of an optimum cutting apparatus is determined depending on a-required working range.

A cutting apparatus including a cutter haft for finish cutting, which has a first cutter blade and a cutter haft for rough cutting, which has a second cutter blade according to another embodiment of the present invention will be described with reference to FIGS. 5A and 5B. FIG. 5A is a side view of a plastic optical fiber cutting apparatus 20 according to this embodiment, and FIG. 5B is a projection view of the front surface of the plastic optical fiber cutting apparatus 20. Like FIGS. 4A and 4B, characters X, Y and Z denote coordinate axes for the convenience of reference. The mounting direction of a POF, and arrangements of respective members are the same as those described in FIGS. 4A and 4B.

Referring to FIGS. 5A and 5B, two columns 27a are fixed to one end of a base 16. A feed screw frame 27e formed into a trough-like shape in cross-section is mounted to an upper end of each of the feed screw frames 27e in such a manner as to extend in the horizontal direction, that is, in parallel to the X-axis. A lead screw 27d for rough cutting is housed in one of the feed screw frame 27e, which lead screw is rotated by a feed motor 27f. Similarly, a lead screw 27c for finish cutting is housed in the other of the feed screw frames 27e, which lead screw is rotated by another feed motor 27f.

A nut 28b meshed with the lead screw 27d located on the left side in the front view of FIG. 5A is integrally connected to an ultrasonic cutter adapter 28 via a connector 28c, and a cutter haft 25d for finish cutting is mounted to the ultrasonic cutter adapter 28. While not shown, a high-frequency mechanical vibration exciter 4 is contained in the cutter haft 25d, and a cutter blade 22d for finish cutting is fixed to the leading end of the high-frequency mechanical vibration exciter 4. The ultrasonic cutter adapter 28 is slid in parallel to the X-axis while being guided by the front surface of a feed screw frame side plate 26d for finish cutting. Accordingly, along with rotation of the feed motor 27f, the cutter blade 22d for finish cutting is moved in parallel to the X-axis via the lead screw 27d by a distance proportional to the rotating angle.

Like the cutter blade 22d for finish cutting, the cutter blade 22c for rough cutting is driven by rotation of the lead screw 27c for rough cutting on the right side in FIG. 5A, and is slid in parallel to the X-axis while being guided by the front surface of a feed screw frame side plate 26c. A nut 28b meshed with the lead screw 27c is integrally connected via a connector 28c to an ultrasonic cutter adapter having a mirror-image relationship with the ultrasonic cutter adapter 28 on the left side, and a cutter haft 25c for rough cutting is, mounted to the ultrasonic cutter adapter. It is to be noted that the ultrasonic cutter adapter on the right side and the cutter haft 25c for rough cutting are omitted in FIG. 5A.

As shown in the front view of FIG. 5A, the cutter blade 22d for finish cutting and the cutter blade 22c for rough cutting are moved on the same plane perpendicular to the Y-axis, and as shown in FIG. 5B, the cutter blades 22d and 22c can be moved in a finish cutter movement range LD and a rough cutter movement range LC, respectively. Before cutting, the cutter hafts 25d and 25c are located at stand-by positions, shown by solid lines, at the left ends, and after cutting, the cutter hafts 25d and 25c are located at escape positions 25dx and 25cx, shown by dashed lines, at the right ends, respectively. With this arrangement, the width of the front side of the cutting apparatus can be made as small as possible.

After the cutter haft 25c for rough cutting, which has ended its rough cutting work, is moved to the escape position 25cX, the cutter haft 25d for finish cutting is moved to perform finish cutting work by the cutter blade 22d for finish cutting. At this time, since the cutter haft 25d is not moved over the escape position 25dx, the cutter blade 22d for finish cutting does not interfere with the cutter blade 22c for rough cutting, which has been moved to the escape position 25cX. It is to be noted that, in order to prevent interference between both the cutter blades, two cutter holding/moving mechanisms as shown in FIGS. 4A and 4B may be disposed in parallel to the X-axis with a distance, which is large enough not to allow interference between both the cutter blades, put between the cutter holding/moving mechanisms, and be moved by a Y-direction feed device 21 (to be described below) movable in the X-axis direction. In this case, however, it is required to increase a stroke of the Y-direction feed device 21.

The above Y-direction feed device 21 movable in the Y-direction is disposed on the base 16. A feed device base 21a of the Y-direction feed device 21 is provided in such a manner as to be movable on the upper surface of the base 16 in a direction parallel to the Y-axis while being guided by two guides mounted on the base 16. A connector plug mounting base 17a and a POF receiving base 17c are fixed on the feed device base 21a in the same positional relationship as that described with reference to FIG. 3. A connector plug 11 is set to the connector plug mounting base 17a by fitting the connector plug 11 in a V-shaped groove formed in the connector plug mounting base 17a, and bringing an end of the connector plug 11 into contact with a longitudinal positioning portion 17b located at an end of the V-shaped groove, thereby positioning the connector plug 11 to the connector plug mounting base 17a. The connector plug 11 may be held to the connector plug mounting base 17a by pressing it with a plate spring 17k fixed to the connector plug mounting base 17a.

A lead screw 21g is driven by a Y-direction feed motor 21f mounted to a mounting base 21c fixed to the base 16, to move the feed device base 21a connected to a nut (not shown) meshed with the lead screw 21g in parallel to the Y-axis, thereby changing a positional relationship in the Y-axis direction between the POF 1 and the cutter blade 22d for finish cutting and the cutter blade 22c for rough cutting.

In other words, the movement amount of the POF 1 relative to each cutter blade in the Y-axis direction is proportional to a rotational angle of the Y-direction feed motor 21f. Accordingly, a cutoff amount of the POF 1, that is, the thickness or length of a rough cutoff piece or a finish cutoff piece of the POF 1 can be freely determined by controlling the rotation of the Y-direction feed motor 21f. Of course, since the positional relationship between each cutter blade and the POP 1 is relatively determined, a motional plane of each cutter blade may be moved with respect to the base 16, for example, by moving the column 27a with respect to the base 16.

A working procedure by the plastic optical fiber cutting apparatus 20 shown in FIGS. 5A and 5B will be described below. It is assumed that two rough cutting works and one finish cutting work are continuously performed. The length or thickness of a finish cutoff piece allowing a best state of a final cut plane of the POF 1 has been experimentally determined. The length of a second rough cutoff piece has been also experimentally determined. The total of the lengths of the second rough cutoff piece and the finish cutoff piece by the two cutting works is thus determined. The length of the POF 1 required for a work of forming an end of the POF 1 in the subsequent step is already known. Accordingly, in the first rough cutting work, the POF 1 is cut such that a portion, having the above total length, of the POF 1 remains.

The setting of the cutting position differs depending the positioning manner. For example, the cutting position may be set by specifying a distance from the rear end of the connector plug 11. The distance from the rear end of the connector plug 11 is expressed as an amount, moved from an initial value, of the Y-direction feed motor 21f. The cutting position in each of the rough and finish cutting works is inputted in-a controller for controlling the cutting apparatus, which controller is generally called "sequencer".

Prior to start of a first rough cutting work, a configuration of a cutter blade used for the first rough cutting work, the feed speed of the cutter blade, and a heating condition, which are selected to meet a desired requirement for the first rough cutting work, are inputted in the sequencer. The heating condition includes a timing of starting excitation, a timing of ending excitation, and an applied amount of current. The same is true for a second rough cutting work and a finish cutting work. Sensing positions of sensor witches (not shown in FIGS. 5A and 5B), which differ depending on each cutting work, are also set.

The cutting steps by the plastic optical fiber cutting apparatus 20 will be described below.

(1) The Y-direction feed device 21 is moved to position the cutter blade 22c for rough cutting to a rough cutting position of the POF 1 that is mounted such that a portion thereof having a total of lengths of all of cutoff pieces projects from the end face of the connector plug 11.

(2) The cutter blade 22c for rough cutting is started to be moved-in the (+X)-direction, that is, in the cutting direction, to a rough cutting start position of the POF 1.

(3) It is detected by the sensor switch 5 that the cutter blade 22c for rough cutting has moved in the cutting direction to the rough cutting start position of the POF 1.

(4) On the basis of a signal, from the sensor switch 5, which indicates that the cutter blade 22c for rough cutting has reached the rough cutting start position of the POF 1, heating of the cutter blade 22 for rough cutting due to high-frequency mechanical vibration is started.

(5) The cutter blade 22c for rough cutting is moved in the cutting direction, to cut the POF 1 while heating it.

(6) It is detected by the sensor switch 5 that the cutter blade 22c has reached an end, on the cutting end side of the cutter blade 22c, of the POF 1.

(7) On the basis of a signal from the sensor switch 5, heating is stopped to end the (first) rough cutting step, and the cutter haft 25c is returned to the stand-by position on the left end.

With the cutting position of the POF 1 changed, the rough cutting step including the above sub-steps (1) to (7) is repeated by a specific number (once more in this embodiment). After completion of all of the rough cutting steps repeated by the specific number, the cutter blade 22c for rough cutting is escaped to the escape position 25cX.

(8) The Y-direction feed motor 21f is rotated to move the connector plug mounting base 17a until the cutter blade 22d for finish cutting representative of the finish cutting means is located at a position corresponding to a (first) cutting position of the POF 1, and more concretely, to move the finish cutting means to a position separated from the leading end of the connector plug 11 in the longitudinal direction by a specific distance.

(9) The cutter blade 22d for finish cutting is moved in the (+X)-axis direction, that is, in the cutting direction to a finish cutting start position.

(10) It is detected by the sensor switch that the cutter blade 22d for finish cutting has been moved to the finish cutting start position.

(11) On the basis of a signal from the sensor switch, which indicates that the cutter blade 22d for finish cutting has reached to the finish cutting start position, high-frequency mechanical vibration is given to the cutter blade 22d for finish cutting.

(12) The cutter blade 22d for finish cutting is moved in the cutting direction, to cut the POF 1.

(13) It is detected by the sensor switch that the cutting has been ended, that is, the cutter blade 22d for finish cutting has reached to an end, on the cutting end side of the cutter blade 22d, of the POF 1.

(14) On the basis of a signal from the sensor switch, which indicates the end of cutting, the high-frequency mechanical vibration is stopped, thereby completing the finish cutting step.

In the case of performing a plurality of finish cutting works while changing the cutting length, the above sub-steps (8) to (14) of the finish cutting step may be repeated by a specific times. After the finish cutting works of the specific times are ended, the cutter blade 22d for finish cutting is escaped to the escape position 25dX.

The cutting process including the plurality of continuous rough cutting and finish cutting works is thus completed. After completion of cutting, the connector plug 11 is removed from the connector plug mounting base 17a. After the two cutter hafts 25c and 25d are returned from the escape positions 25cX and 25dX to the stand-by positions, the connector plug 11 of the next workpiece is set to the connector plug mounting base 17a, followed by cutting thereof.

In the above cutting process, the cutter haft having been used for first rough cutting is not required to be returned to the stand-by position after being moved forward to the escape position, or may be directly returned to the stand-by position without movement forward to the escape position, or may be returned to a position immediately before the cutting start position without return to the stand-by position. The cutter haft for rough cutting may be escaped until the escape position at the time of completion of all of the rough cutting works, and therefore, can be finely set for shortening the cutting time.

When the cutter is moved forward to the cutting end position, the high-frequency mechanical vibration may be controlled such that a vibration amount thereof be set to a value lower than that during cutting, in place of stoppage of excitation of the high-frequency mechanical vibration.

As described above, the plastic optical fiber cutting apparatus 20 including the two cutter blades for finish cutting and rough cutting, wherein the two cutter blades are independently operable, is desirably usable for continuously cutting one POF by a plurality of times with the connector plug 11 left as mounted to the mounting base. One modification of the above-described cutting apparatus improved to reduce the cost will be described below, wherein only one cutter haft having a two-piece cutter blade element is moved by one cutter haft feed device, like the cutting apparatus 17 shown in FIGS. 4A and 4B.

The two-piece cutter blade element mounted to one cutter haft, which is used for both a rough cutting step and a finish cutting step, will be described below. In this case, a rough cutter blade is used only for a first cutting work of a POF having a long excess portion, and a finish cutting blade is used for remaining several cutting works of the POF.

Figure 6A:
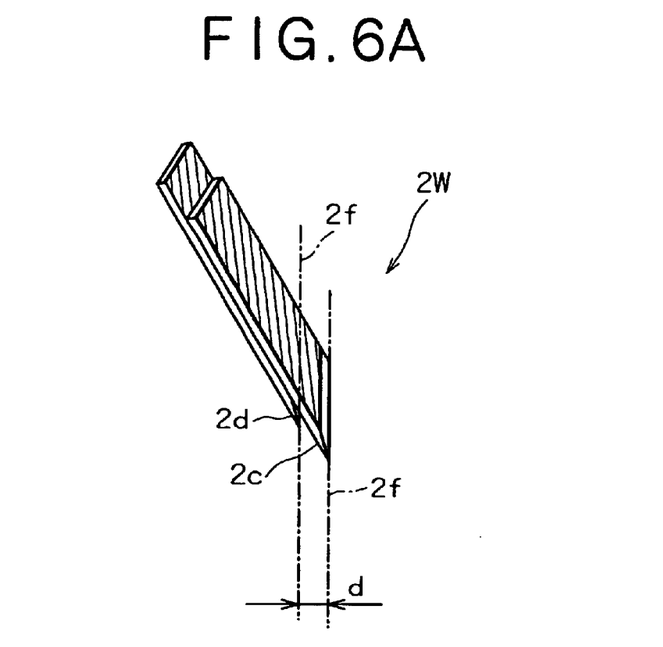
FIG. 6A is a perspective view showing a configuration of a two-piece cutter blade element.
Figure 6B:
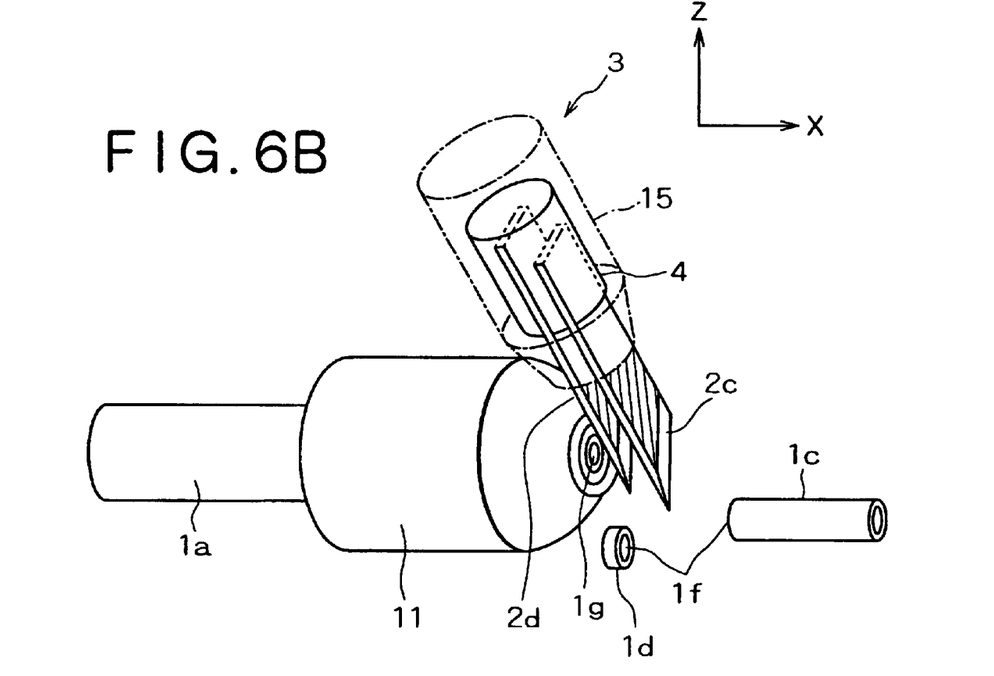
FIG. 6B is a typical view illustrating a method of performing rough cutting and finish cutting at once.

First, the structure of the two-piece cutter blade element will be described with reference to FIGS. 6A and 6B. FIG. 6A is a perspective view of a two-piece cutter blade element 2W, and FIG. 6B is a typical view illustrating a state that a POF 1 is cut by the two-piece cutter blade element 2W. In FIG. 6B, a cutter haft 15 containing a high-frequency mechanical vibration exciter 4 as well as the two-piece cutter blade element 2W is depicted in perspective.

Two cutting edge lines 2f of two cutter blades of the two-piece cutter blade element 2W extend in parallel to each other. Like the one-piece cutter blade shown in FIGS. 4A and 4B, the cutter haft 15 is moved in a direction perpendicular to the cutting edge lines 2f. The two cutter blades of the two-piece cutter blade element 2W are taken as a rough cutter blade 2c and a finish cutter blade 2d. These rough cutter blade 2c and the finish cutter blade 2d are mounted to one high-frequency mechanical vibration exciter 4 in such a manner as to be separated from each other with a specific gap put therebetween. The POF 1 in a state being in contact with the rough cutter blade 2c and the finish cutter blade 2d can be heated via these cutter blades 2c and 2d by high-frequency mechanical vibration generated by the high-frequency mechanical vibration exciter 4.

In this case, to adjust the heating degree of the POF 1, the cutter blades 2c and 2d may be offset from each other along the cutting edge lines 2f, that is, in the Z-axis direction in such a manner that a central portion of the rough cutter blade 2c corresponds to a rough cutting position of the POF 1 and a leading end of the finish cutting blade 2d corresponds to a finish cutting position of the POF 1. The cutter blades 2c and 2d may be mounted such that the cutting edge lines 2f thereof are offset from each other in the forward movement direction (the Y-axis direction perpendicular to the X-axis direction shown in FIGS. 6A and 6B) of the cutter haft 15. With this mounting, finish cutting can be started after rough cutting somewhat proceeds or after perfectly ended.

With the use of the two-piece cutter blade element 2W, a rough cutoff piece 1c having a long excess length and a finish cutoff piece 1d having a specific excess length can be cut off from the POF 1 at once. In this case, the POF 1 can be cut by an optimum portion, that is, a central portion or a leading end of each of the cutter blades of the two-piece cutter blade element 2W. By suitably selecting the arrangement of the two-piece cutter blade element 2W such that the two cutter blades are offset in the vertical direction, that is, the Z-axis direction, or in the lateral direction, that is, the Y-axis direction, the cut plane of the POF 1 at the leading end of the connector plug becomes a desirable finish cut plane 1g.

Assuming that a gap between the two cutter blades of the two-piece cutter blade 2W is taken as "d", if the cutting is performed such that a finish cutoff piece 1d thinner than the gap "d" is cut off, the rough cut blade 2c does not come into contact with the POF 1, that is, the rough cut blade 2c is not used for cutting. As a result, by repeatedly cutting the POF 1 by several times under a cutting condition that a finish cutoff piece thinner than the gap "d" is cut off in each cutting, the same effect as that obtained by using one-piece finish cutter blade can be obtained.

The two-piece cutter blade 2W may be mounted to one of the cutter mounting portions of the plastic optical fiber cutting apparatus 20 shown in FIG. 5A, or mounted to the Y-direction feed device 21, additionally provided on the cutting apparatus shown in FIG. 4A, for moving the POF 1 in the Y-axis direction. With this arrangement, the two-piece cutter blade 2W can be efficiently used.

A cross-sectional shape, perpendicular to the cutting edge line 2f, of the cutter blade used for cutting the POF 1 exerts a large effect on the finish state of the finish cut plane 1g. In general, from the viewpoint of the shape of a blade plane, a manual cutting tool including a cutter blade is classified into a single-edged type and a double-edged type. FIGS. 7A to 7E are typical views illustrating how each of a single-edged cutter blade or a double-edged cutter blade should be tilted with respect to the axial line of the POF 1.

Figure 7A:
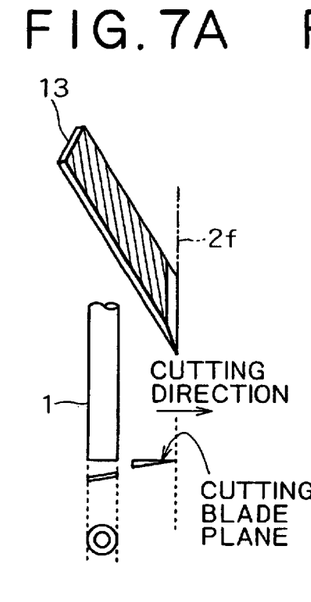
FIGS. 7A to 7E are typical views illustrating a setting angle and a movement direction of each of cutter blades having different cross-sectional shapes with respect to a plastic optical fiber.
Figure 7B:
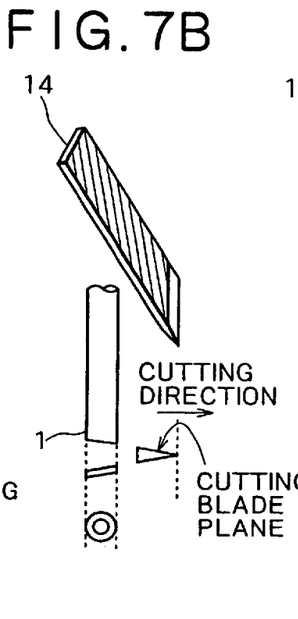
Figure 7C:
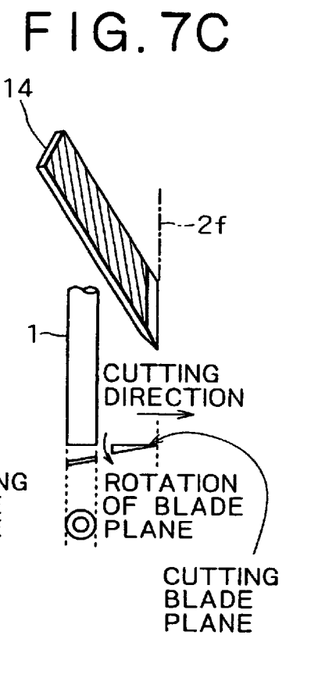

First, a difference between a single-edged cutter blade and a double-edged cutter blade will be briefly described. It is assumed that both front and back blade planes of a cutter blade cross each other at a cutting edge line 2f, to form a cutting edge. Meanwhile, as shown in FIGS. 7A, 7B and 7C, a cutter blade is produced by forming a blade portion at part of a rectangular plate having a specific thickness, wherein the front surface, shown as hatched, of the rectangular plate of the cutter blade is parallel to the back surface thereof, with a distance therebetween taken as a thickness of the rectangular plate of the cutter blade. If one of both the blade planes of a cutter blade is formed by the back surface of the rectangular plate opposed to the front surface thereof shown as hatched, such a cutter blade is called "single-edged cutter blade". In this single-edged cutter blade, the blade plane formed by the back surface is called "blade back", and the blade plane tapered so as to cross the front surface shown as hatched is called "blade front".

If both the front and back blade planes are not parallel to the front surface, shown as hatched, of the rectangular plate of a cutter blade, and more concretely, if the front blade plane is tapered so as to cross the front surface shown as hatched at a certain angle and the back blade plane is similarly tapered so as to cross the back surface at the same angle, such a cutter blade is called "double-edged cutter blade". If a double-edged cutter blade has equalized front and back blade planes, a cutting edge line 2f of the cutter blade is located at the center of the rectangular plate of the cutter blade in the thickness direction. Such a double-edged cutter blade, which is generally commercially available, is suitable as a cutter to be mounted to the high-frequency mechanical vibration exciter.

In the case of using a single-edged cutter blade 13 as shown in FIG. 7A, the blade back thereof is used as the cutting blade plane. In this case, the cutting blade plane is parallel to a cut plane of a POF 1. The POF 1 may be cut by vertically feeding the cutter blade 13 with its blade back, parallel to the front surface shown as hatched, kept as being perpendicular to the axial line of the POF 1. With this cutting of the POF 1 by the cutter blade 13 kept in the above posture, since a plane to be cut of the POF 1 is perpendicular to the axial line of the POF 1, it is possible to obtain an ideal cut plane of the POF 1.

If a double-edged cutter blade 14 shown in FIG. 7B, which is replaced from the above single-edged cutter blade 13, is fed for cutting with its posture kept as being the same as that of the single-edged cutter blade 13, as exaggeratedly shown in FIG. 7B, since the back blade plane is not parallel to a plane perpendicular to the axial line of the POF 1 but is tilted therefrom, the cut plane of the POF 1 is tilted at a certain angle with respect to the plane perpendicular to the axial line of the POF 1. Such a tilted cut plane of the POF 1 may exert adverse effect on the quality of the POF 1 worked in the subsequent step. It is to be noted that the tilt angle is equivalent to a half of an angle formed by the two blade planes.

The inconvenience associated with the tilted cut plane as described above can be eliminated by a manner shown in FIG. 7C, wherein a cutter haft 15 is turned around the cutting edge line 2f by an angle equivalent to a half formed by the two blade planes with the position and the direction of the cutting edge line 2f kept as they are. With this arrangement, like the cutting blade plane formed by the blade back of the single-edged cutter blade shown in FIG. 7A, the direction of the back side cutting blade plane of the double-edged cutter blade is kept as being parallel to a plane perpendicular to the axial line of the POF 1, with a result that the cut plane of the POF 1 becomes correspondingly parallel to the plane perpendicular to the axial line of the POF 1. In this way, even in the case of using the double-edged cutter blade 14, a desirable cut plane comparable to that obtained by using the single-edged cutter blade 13 can be obtained by suitably turning the cutter haft 15.

It may be considered that, to finely adjust the degree of heating due to ultrasonic vibration and a cutting state of a cut plane, the POF 1 be cut by a cutter blade whose cutting blade plane is further turned by a so-called relief angle or a biting angle. Even if the blade back of a cutter blade is kept as being parallel to a plane perpendicular to the axial line of the POF 1 as shown in FIGS. 7A and 7C, since a cutting start portion of the POF 1 is being in contact with the cutter blade longer than a cutting end portion of the POF does, the heating degree of the cutting start portion of the POF 1 is larger than that of the cutting end portion of the POF 1. To cope with such an inconvenience, the posture of the cutter blade may be set such that the other portion of the cutter blade other than the cutting edge line 2f is retreated, that is, escaped, so that during cutting, only the cutting edge line 2f be in contact with a portion to be cut of the POF 1.

Figure 7D:
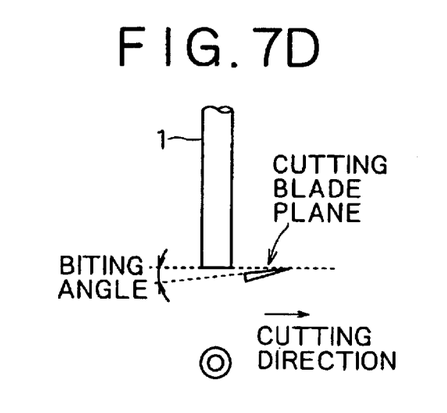
Figure 7E:
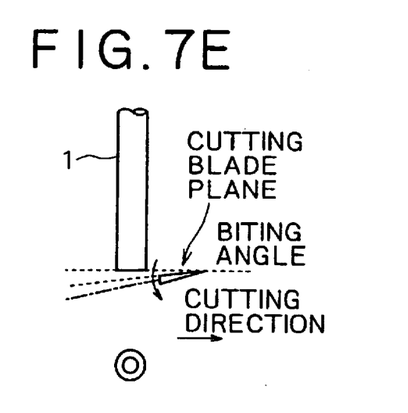

FIGS. 7D and 7E typically show cutter blades each having such a relief angle, that is, a biting angle. The cutter blade shown in FIG. 7D is a single-edged cutter blade equivalent to the single-edged cutter blade 13 shown in FIG. 7A and the cutter blade shown in FIG. 7E is a double-edged cutter blade equivalent to the double-edged cutter blade 14 shown in FIG. 7C, wherein the cutter blade plane is turned by a specific angle equivalent to a relief angle.

As described above, with the use of the cutter blade making use of ultrasonic vibration, it is possible to effectively prevent adverse effect on a core portion forming a central portion of a POF upon cutting, for example, a defect of the core portion due to chips, or cracks extending from a remaining finish cut plane to the interior of the core portion.

As described above, a POF is configured such that a coating different in material from a core is formed into a ring-shape on the outer periphery of the core. To be more specific, a cladding layer is formed on the outer periphery of the core, and a protective layer is formed on the cladding layer. At the time of cutting a POF, the coating is softened to extend longer in the shape of whiskers, which are called "cladding whiskers". Special measures must be taken to cope with occurrence of such cladding whiskers. As the degree of heating a POF by ultrasonic vibration becomes larger to enhance state of a cut plane of a core of the POF, the degree of softening the coating of the POF becomes larger, which leads to the easier formation of cladding whiskers. As described above, the cladding whiskers may be rolled in a core portion, tending to exert adverse effect on transmission characteristics of the POF. Accordingly, it is required to take a separate measure for preventing occurrence of such cladding whiskers.

Figure 8:
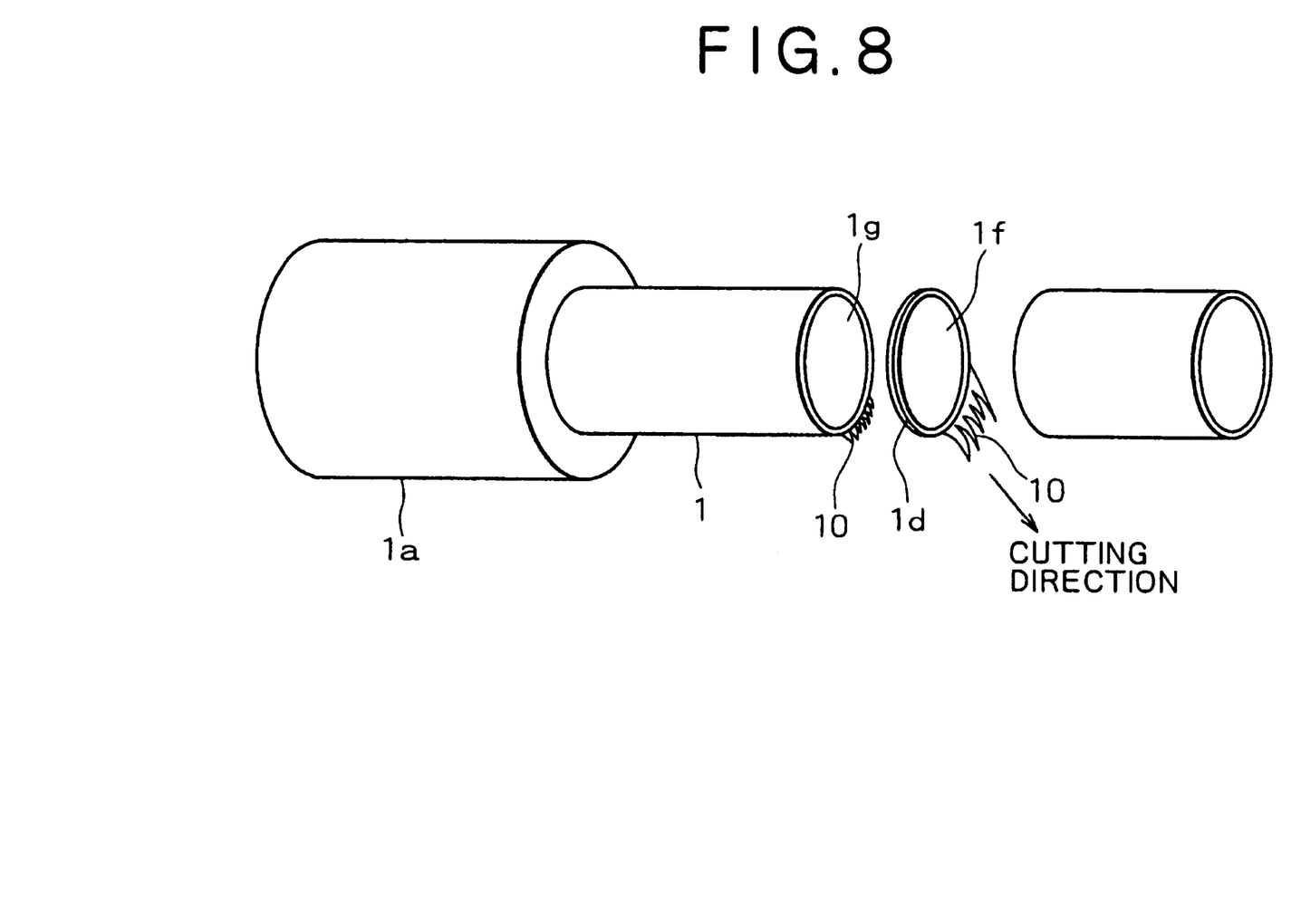
FIG. 8 is a perspective view illustrating a state that a cladding layer of a plastic optical fiber extends in the form of whiskers at the time of cutting the plastic optical fiber.

FIG. 8 is a typical perspective view of an optical fiber cable 1a, illustrating a cutting condition and a state of occurrence of cladding whiskers. As shown in this figure, at the time of rough cutting of a POF by a cutter blade, a large number of cladding whiskers 10 occur at a rough cut plane 1f, wherein the cladding whiskers 10 extend in a direction parallel to the cutting direction, that is, in the direction of forward movement of the cutter blade. The cladding whiskers 10 also occur at a finish cut plane 1g, although the amount thereof is small.

Figure 9A:
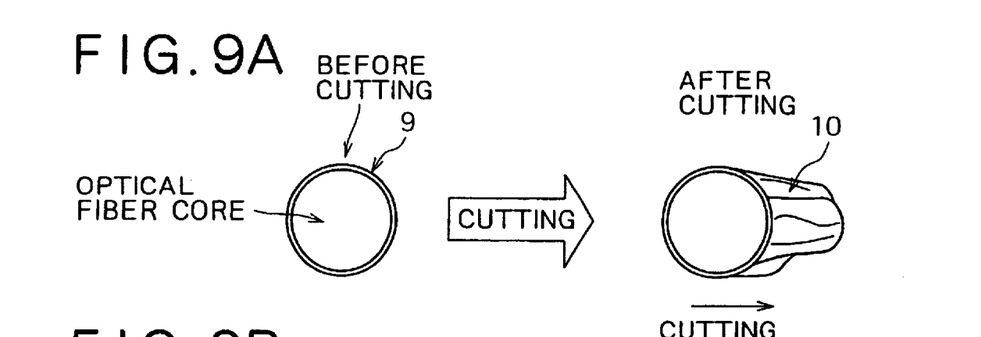
FIGS. 9A to 9D are typical views illustrating measures for preventing occurrence of extension of a cladding layer in the form of whiskers.

Various methods of reducing occurrence of the cladding whiskers 10 to a degree negligible from the practical viewpoint will be described with reference to FIGS. 9A to 9D. FIGS. 9A to 9D are typical sectional views showing cut planes of POFs cut by the cutting methods improved to reduce occurrence of the cladding whiskers 10. For comparison, the state of the cladding whiskers 10 occurring when the POF is cut by a general cutting method not improved to reduce occurrence of the cladding whiskers 10 is shown in FIG. 9A.

In general, at the time of cutting a POF, the cladding whiskers 10 occur on an edge, on the cutting end side of a cutter blade, of the POF in such a manner as to project therefrom in the cutting direction. The reason for this may be considered that the temperature of the POF become highest at the end of cutting. Accordingly, an effect of preventing occurrence of the cladding whiskers 10 can be obtained by cooling the cutting end side of the POF to such a degree as not to exert adverse effect on the cutting condition. It is also effective to remove a coating somewhat at a portion near a cutting position before cutting.

Figure 9B:
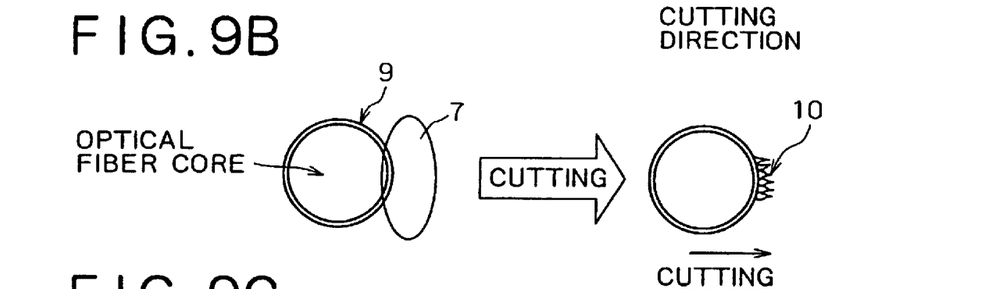

One of the methods for reducing occurrence of the cladding whiskers 10 is shown in FIG. 9B, wherein a piece of cotton or a sponge-like pad impregnated with a coolant is placed in proximity to or in contact with an outer peripheral surface of a POF, thereby dissipating heat generated from the outer peripheral surface of the POF by thermal conduction or thermal radiation. The coolant used may be a liquid or a gel-like coolant. In place of the use of the pad or the like, a solid coolant may be directly placed in proximity to or in contact with a cladding layer.

Figure 9C:
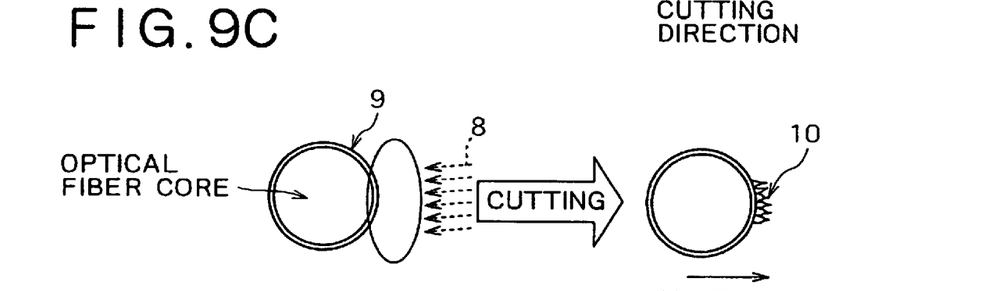

Another method is shown in FIG. 9C, wherein a cooling effect is achieved by spraying a mist of a coolant to a portion, near the cutting end side, of the cladding layer of the POF. The coolant is not limited to liquid but may be gas. In this case, the gaseous coolant may be sprayed or injected. It is to be noted that a nozzle Ba for spraying a coolant is shown in FIG. 4B. In this way, it is possible to reduce occurrence of the cladding whiskers 10 to a degree negligible from the practical viewpoint by adopting the cooling method configured such that heat generated at a portion, on the cutting end side of the cutter blade, of the cladding layer of the POF is dissipated by placing a coolant in the form of gas, liquid, or solid in proximity to or in contact with the above portion of the cladding layer.

Figure 9D:
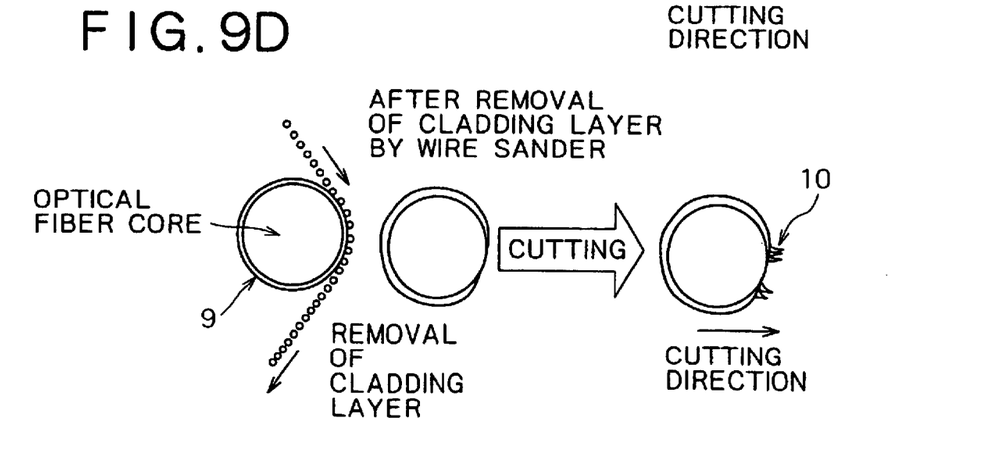

A further method is shown in FIG. 9D, wherein before or during cutting, part of a cladding layer 9 is removed by grinding it with a tape-like abrasive paper or a wire sander. In this method, to prevent occurrence of the cladding whiskers 10, the thickness of the cladding layer 9 is reduced. A large number of abrasive papers or wire sanders are commercially available, among which suitable one can be easily selected.

Although the outline of the plastic optical fiber cutting apparatus of the present invention has been described by way of the embodiments and the various application examples thereof, such description is for illustrative purposes only, and it is to be understood that changes and variations may be made without departing from the spirit or scope of the present invention.

For example, in each of the embodiments, the cutting apparatus has been described by using the example that an optical fiber fixed to a plug is cut at position projecting from the plug by a specific length; however, the present invention can be applied to an example that two single optical fibers not held by plugs are cut and connected to each other. Even in this case, the effect of improving optical transmission characteristics can be obtained. It is to be noted that in this case, the optical fiber is subjected to finish cutting at a specific position, which is not a finish cutting position separated from an end portion of a plug by a specific distance but is a finish cutting position necessary for connection, and is subjected to rough cutting at a position separated from the finish cutting position by a specific distance.

What is claimed is:

1. A cutting apparatus for cutting a plastic optical fiber, comprising:
   cutting means for cutting a plastic optical fiber; and
   positioning means for positioning said cutting means to at least a first position at which said plastic optical fiber is to be subjected to rough cutting, and to at least a second position at which said plastic optical fiber is to be subjected to finish cutting.

2. A cutting apparatus according to claim 1, further comprising:
   vibration means for giving high-frequency mechanical vibration to a portion, being in contact with said plastic optical fiber, of said cutting means, and allowing said cutting means to heat and cut the contact portion of said plastic optical fiber.

3. A cutting apparatus according to claim 2, further comprising:
   control means for controlling vibration caused by said vibration means.

4. A cutting apparatus according to claim 3, wherein said control means controls the vibration caused by said vibration means on the basis of a cutting position of said plastic optical fiber.

5. A cutting apparatus according to claim 4, further comprising:
   distance detecting means for detecting a distance between said plastic optical fiber and said cutting means;
   wherein said control means controls the vibration caused by said vibration means on the basis of a result detected by said distance detecting means.

6. A cutting apparatus according to claim 5, wherein said vibration means is controlled such that a vibration amount is set to a value suitable for cutting when it is decided that said cutting means has reached a portion near said plastic optical fiber and is set to a value smaller than said value suitable for cutting when it is decided that said cutting means has reached a cutting end position.

7. A cutting apparatus according to claim 3, wherein said control means controls a temperature of a portion to be cut of said plastic optical fiber on the basis of a current applied to said vibration means.

8. A cutting apparatus according to claim 3, further comprising:
   temperature detecting means for detecting a temperature rise of said plastic optical fiber due to heat given by said cutting means;
   wherein said control means controls a temperature of a portion to be cut on the basis of a result detected by said temperature detecting means.

9. A cutting apparatus according to claim 3, wherein said control means controls a temperature of a portion to be cut of said plastic optical fiber on the basis of a time required to apply vibration to said cutting means.

10. A cutting apparatus according to claim 1, further comprising:
   cooling means for cooling a portion, near a cutting position, of said plastic optical fiber by said cutting means.

11. A cutting apparatus according to claim 10, wherein said cooling means cools the portion to be cooled of said plastic optical fiber by spraying a mist of a liquid coolant.

12. A cutting apparatus according to claim 1, further comprising:
   movement means for moving said cutting means to each cutting position.

13. A cutting apparatus according to claim 1, wherein said plastic optical fiber is provided with a plug required to be connected to equipment for communication of optical communication data, and said second position at which finish cutting is to be performed is located near said plug.

14. A cutting apparatus according to claim 1, wherein said cutting means includes first cutting means for performing finish cutting of said plastic optical fiber, and second cutting means for performing rough cutting of said plastic optical fiber.

15. A cutting apparatus according to claim 1, further comprising:
   distance changing means for changing a distance between said cutting means and said plastic optical fiber.

16. A cutting method of cutting a plastic optical fiber by using cutting means comprising the steps of:
   positioning said cutting means to a first position at which said plastic optical fiber is to be subjected to rough cutting;
   cutting said plastic optical fiber at said first position by said cutting means;
   positioning said plastic optical fiber to a second position at which said plastic optical fiber is to be subjected to finish cutting; and
   cutting said plastic optical fiber at said second position by said cutting means.

17. A cutting method according to claim 16, wherein in each of said cutting steps, said cutting means is heated by high-frequency mechanical vibration, to cut said plastic optical fiber.

18. A cutting method according to claim 17, further comprising the step of:
   detecting that the temperature of said cutting means reaches a specific temperature;
   wherein the cutting of said plastic optical fiber is performed when it is detected that the temperature of said cutting means reaches said specific temperature.

19. A cutting method according to claim 16, further comprising the step of:
   moving, prior to positioning of said cutting means to said second position, said cutting means from said first position to said second position.

* * * * *